US012104778B1

(12) United States Patent
Chen et al.

(10) Patent No.: US 12,104,778 B1
(45) Date of Patent: Oct. 1, 2024

(54) ULTRATHIN LED LAMP MIRROR AND MIRROR CABINET

(71) Applicant: LAMXON TECHNOLOGY BUILDING MATERIALS CO., LTD., Dongguan (CN)

(72) Inventors: Qingyuan Chen, Dongguan (CN); Chihsu Tu, Dongguan (CN); Qiang Chen, Dongguan (CN); Xinwei Li, Dongguan (CN)

(73) Assignee: LAMXON TECHNOLOGY BUILDING MATERIALS CO., LTD., Dongguan (CN)

( * ) Notice: Subject to any disclaimer, the term of this patent is extended or adjusted under 35 U.S.C. 154(b) by 0 days.

(21) Appl. No.: 18/424,729

(22) Filed: Jan. 26, 2024

(30) Foreign Application Priority Data

Dec. 7, 2023 (CN) ......................... 202311674739.6

(51) Int. Cl.
*F21V 33/00* (2006.01)
*F21V 23/02* (2006.01)
*F21Y 115/10* (2016.01)

(52) U.S. Cl.
CPC ............ *F21V 33/004* (2013.01); *F21V 23/02* (2013.01); *F21Y 2115/10* (2016.08)

(58) Field of Classification Search
CPC ........ F21V 33/004; F21V 23/02; F21V 33/00; F21V 33/0004; F21V 23/0442; F21V 23/0457; F21Y 2115/10
See application file for complete search history.

(56) References Cited

U.S. PATENT DOCUMENTS

| | | | | |
|---|---|---|---|---|
| 6,932,488 | B1 * | 8/2005 | Horn | F21V 33/004 362/128 |
| 7,600,886 | B1 * | 10/2009 | Sullivan | A47G 1/02 359/872 |
| 9,765,958 | B2 * | 9/2017 | Lumaye | F21V 33/0004 |
| 11,543,118 | B1 * | 1/2023 | Zhan | F21V 33/004 |
| 2007/0159316 | A1 * | 7/2007 | Mischel, Jr. | A47G 1/02 340/461 |
| 2015/0159856 | A1 * | 6/2015 | Adachi | F21V 33/0056 362/135 |
| 2020/0008592 | A1 * | 1/2020 | Meyers | G06F 3/02 |

FOREIGN PATENT DOCUMENTS

| | | | |
|---|---|---|---|
| CN | 211582210 | U | 9/2020 |
| CN | 211582815 | U | 9/2020 |
| CN | 111938472 | A | 11/2020 |

* cited by examiner

*Primary Examiner* — Bao Q Truong
(74) *Attorney, Agent, or Firm* — Nitin Kaushik

(57) ABSTRACT

The present invention relates to the technical field of intelligent bathroom mirrors, and in particular to an ultrathin LED lamp mirror and a mirror cabinet. The ultrathin LED lamp mirror includes a plurality of power utilization modules. Each of the power utilization modules is connected to a driving block. The driving block is configured to supply power for each of the power utilization modules. The power utilization modules are LED lamp sections or heating films. An objective of the present invention is to provide an ultrathin LED lamp mirror. The plurality of power utilization modules are driven by the plurality of driving blocks, respectively, so that the plurality of driving blocks can be tiled in a lamp mirror body, thereby reducing a thickness of the lamp mirror and achieving the design of the ultrathin LED lamp mirror.

6 Claims, 1 Drawing Sheet

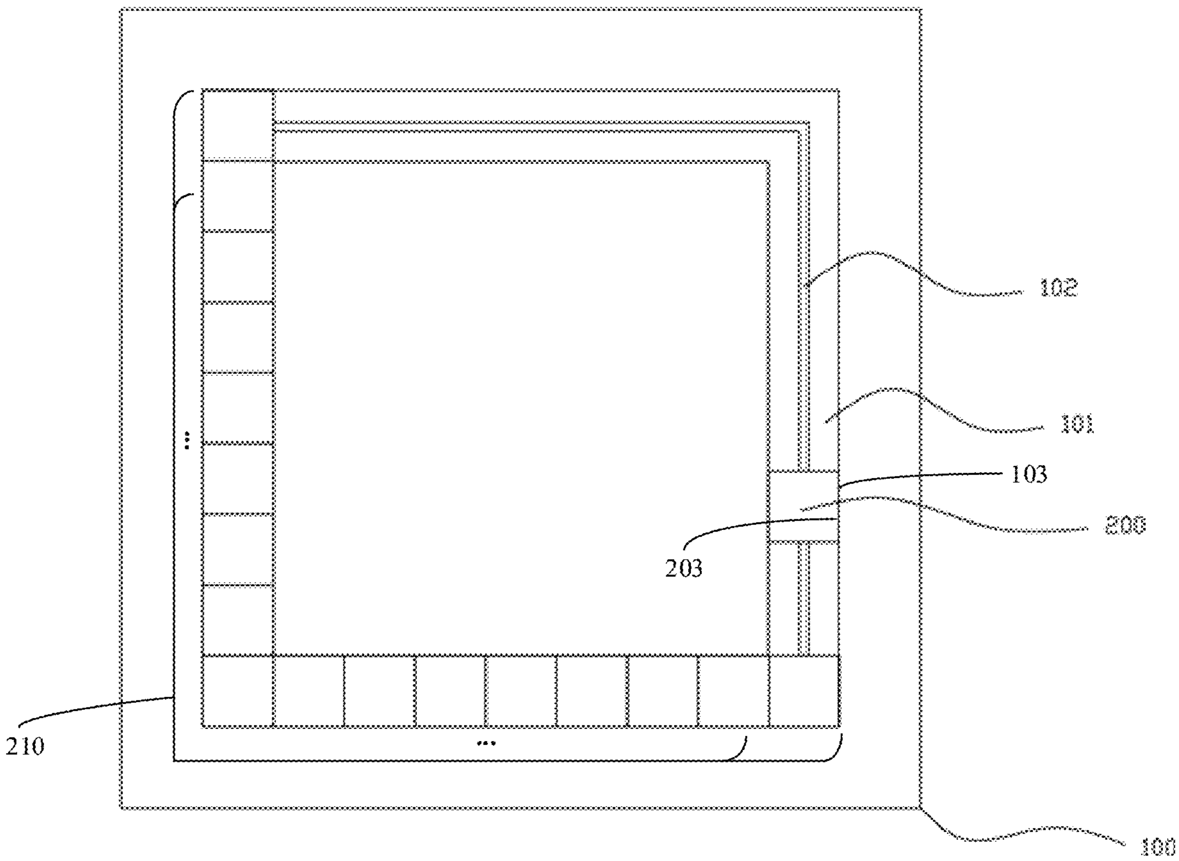
102
101
103
200
203
210
100

ULTRATHIN LED LAMP MIRROR AND MIRROR CABINET

CROSS-REFERENCE TO RELATED APPLICATIONS

The application claims priority to Chinese patent application No. 2023116747396, filed on Dec. 7, 2023, the entire contents of which are incorporated herein by reference.

TECHNICAL FIELD

The present invention relates to the technical field of intelligent bathroom mirrors, and in particular to an ultrathin LED lamp mirror and a mirror cabinet.

BACKGROUND

Bathroom mirrors with lamps (hereinafter referred to as lamp mirrors) are widely used in bathrooms or dressing rooms. Lamps in existing bathroom mirrors used for illuminating users, lighting and providing ambient light, but the lamps of these bathroom mirrors generally do not have an intelligent adjustment function.

Generally, the bathroom mirror takes an LED lamp strip as a light source, and the LED lamp strip is driven by a special driver to emit light. However, in the prior art, the LED lamp strip is driven by a single driver; and generally, the length of the LED lamp strip and the power of the driver have marginal effect, that is, in a case that the lamp strip increases by X times, the volume of the driver increases by N*X times, and N increases with the increase of the length of the LED lamp strip.

In addition, a heating film and other power utilization modules of the lamp mirror are required to be driven by drivers, resulting in that the larger the area of the mirror surface of the lamp mirror, the longer the LED lamp strip, the larger the heating film, the greater the power demand for the driver, and thus the larger the required specification of the driver. The specification of the driver will inevitably lead to an increase of the thickness of the lamp mirror, so that the thickness of the lamp mirror will inevitably increase with the increase of the area of the mirror surface, and apparently, the mounting requirement is higher. The prior art also lacks a solution to this problem.

SUMMARY

To overcome the shortcomings and deficiencies in the prior art, an objective of the present invention is to provide an ultrathin LED lamp mirror and a mirror cabinet, thereby avoiding the increase of a thickness of the lamp mirror while increasing power utilization modules.

The present invention is achieved through the following technical solutions:

an ultrathin LED lamp mirror includes a plurality of power utilization modules; each of the power utilization modules is connected to a driving block, and the driving block is configured to supply power for each of the power utilization modules; and the power utilization modules are LED lamp sections or heating films.

An annular groove with an equal width is formed in an outer end face of the lamp mirror body, and a conductive sliding rail is formed in a bottom wall or a side wall of the annular groove; and each of the LED lamp sections and the driving block corresponding thereto are assembled to form a lamp section unit, a shape of the lamp section unit is adapted to a cross-sectional shape of the annular groove, a conductive contact for abutting against the conductive sliding rail is arranged on a lower end face or a side surface of the lamp section unit, and the conductive contact is electrically connected to the driving block.

First magnetic attraction pieces with the number corresponding to that of the lamp section units are formed on a side wall of the annular groove, and a plurality of first magnetic attraction pieces are arranged equidistantly; and a second magnetic attraction piece for adsorbing each of the first magnetic attraction pieces is arranged on one side of the lamp section unit.

The power utilization modules are LED lamp sections, and a plurality of LED lamp sections are connected sequentially to form a lamp strip of the LED lamp mirror.

The total power setting of all the driving blocks performs the following method:

establishing the following linear programming models:

minimaze $V=N\times V_N+M\times V_M$, subject to $N\times M\times P=S$, $N\times M\times P\times L_{MIN}\leq L\leq N\times M\times P\times L_{MAX}$, $N\times M\times P\times B_{MIN}\leq B\leq N\times M\times P\times B_{MAX}$, $N, M\in Z^+$, where V is a total volume of a driving mechanism, N is the number of the LED lamp sections, M is a length of the LED lamp strip, $V_N$ is a volume of a driving mechanism of each of the LED lamp sections, $V_M$ is a volume of each of the lamp section units, P is a power of each of the LED lamp sections, S is a total power of the lamp mirror, L is a length of the lamp mirror, $L_{MIN}$ and $L_{MAX}$ are a minimum length and a maximum length of the lamp mirror, B is a brightness of the lamp mirror, $B_{MIN}$ and $B_{MAX}$ are a minimum brightness and a maximum brightness of the lamp mirror, and $Z^+$ represents a positive integer set.

The number of the LED lamp sections is set as:

$$N = \text{round}\left(sqrt\left(\frac{S}{L*P}\right)\right),$$

where N is the number of the LED lamp sections, S is a total power of the lamp mirror, L is a length of the lamp mirror, and P is an average power of each of the LED lamp sections.

the number of LED lamps in each of the LED lamp sections is set as:

$$M = \text{round}\left(\frac{L}{N*P}\right),$$

where M is a length of an LED lamp strip.

The ultrathin LED lamp mirror further includes a control block and several sensors in signal connection with the control block, and the sensors are configured to acquire information of a current usage scenario.

The control block is configured to perform the following algorithm:

$$L_i = K\times\frac{D_i}{D_0}\times\frac{A_i}{A_0}\times\frac{E_0}{E_i},$$

where $L_i$ is a target brightness of an ith LED lamp section, K is a constant, $D_i$ is a distance between the ith LED lamp section and a human body; $D_0$ is a reference distance, $A_i$ is an included angle between the ith LED lamp section and a human face, $A_0$ is a reference angle, $E_i$ is an ambient illumination of a position where the ith LED lamp section is located, and $E_0$ is a reference illumination.

The present invention further provides a mirror cabinet, including a cabinet body and a cabinet door rotatably arranged on the cabinet, where the ultrathin LED lamp mirror is arranged at one end of the cabinet door facing away from the cabinet body.

The present invention has the following beneficial effects:

According to the ultrathin LED lamp mirror of the present invention, the plurality of power utilization modules are driven by the plurality of driving blocks, respectively, so that the plurality of driving blocks can be tiled in a lamp mirror body, thereby reducing a thickness of the lamp mirror and achieving the design of the ultrathin LED lamp mirror.

BRIEF DESCRIPTION OF DRAWINGS

The present invention is further illustrated by the accompanying drawings, but embodiments in the accompanying drawings do not constitute any limitation to the present invention. Those of ordinary skill in the art may also derive other drawings from the following drawings without creative efforts.

The FIGURE is a front view of the present invention.

REFERENCE NUMERALS OF THE DRAWINGS

Lamp mirror body—100, annular groove—101, conductive sliding rail—102, first magnetic attraction peices—103, lamp section unit—200, second magnetic attraction pieces—203, LED lamp strip—210.

DETAILED DESCRIPTION OF THE EMBODIMENTS

To make the foregoing objectives, features and advantages of the present invention more apparent and comprehensible, the specific implementations of the present invention are described in detail below with reference to the accompanying drawings. In the following description, many specific details are illustrated for a thorough understanding of the present invention. However, the present invention may be implemented in many other ways different from those described herein. A person skilled in the art may make similar improvements without departing from the connotation of the present invention. Therefore, the present invention is not limited to the specific embodiments disclosed below.

In the description of the present invention, it should be understood that orientation or position relationships indicated by the terms such as "center", "longitudinal", "transverse", "length", "width", "thickness", "above", "below", "front", "back", "left", "right", "perpendicular", "horizontal", "top", "bottom", "inside", "outside", "clockwise", "anticlockwise", "axial direction", "radial direction", and "circumferential direction" are based on the orientation or position relationships shown in the accompanying drawings, and are merely intended to facilitate a simple description of the present invention, rather than indicating or implying that the mentioned device or element must have a particular orientation or must be constructed and operated in a particular orientation. Therefore, such terms should not be construed as limitations to the present invention.

In addition, terms "first" and "second" are used merely for description, and shall not be construed as indicating or implying relative importance or implicitly indicating a quantity of indicated technical features. Therefore, a feature defined by "first" or "second" may explicitly indicate or implicitly include at least one of such features. In the description of the present invention, "multiple" means at least two, such as two and three unless otherwise explicitly and specifically defined.

Bathroom mirrors with lamps (hereinafter referred to as lamp mirrors) are widely used in bathrooms or dressing rooms. Lamps in existing bathroom mirrors used for illuminating users, lighting and providing ambient light, but the lamps of these bathroom mirrors generally do not have an intelligent adjustment function.

Generally, the bathroom mirror takes an LED lamp strip as a light source, and the LED lamp strip is driven by a special driver to emit light. However, in the prior art, the LED lamp strip is driven by a single driver; and generally, the length of the LED lamp strip and the power of the driver have marginal effect, that is, in a case that the lamp strip increases by X times, the volume of the driver increases by N*X times, and N increases with the increase of the length of the LED lamp strip.

The larger the lamp mirror, the longer the demand for the LED lamp strip. Since the volume of the driver cannot be reduced, the current lamp mirror is thick and cannot be made thin. The prior art also lacks a solution to this problem.

Embodiment 1

To solve the above problem, this embodiment discloses an ultrathin LED lamp mirror with a structure shown in the figure. The lamp mirror includes a lamp mirror body 100 and a plurality of power utilization modules mounted on the lamp mirror body 100.

The power utilization modules may be LED lamp sections or heating films. Specifically, an LED lamp strip arranged in the lamp mirror body 100 is surrounded by more than one LED lamp section; and each of the power utilization modules is connected to a driving block, and the driving block is preferably a driver.

During actual use, a plurality of driving blocks are controlled by one control block, that is, the control block sends an instruction to adjust on-off or output power of the driving blocks so as to achieve the control effect. In addition, the plurality of driving blocks are connected with each other in parallel. In a case that one of the driving blocks is damaged, the normal work of the other driving blocks will not be affected.

Compared with the prior art, the present invention has the following advantages: a large driver is divided into several small driving blocks, the whole LED lamp strip is divided into a plurality of LED lamp sections, and each of the driving blocks is required to drive only one LED lamp section/heating film. Since the total driving power required by one driving block is reduced, the volume will be inevitably reduced, and a plurality of driving blocks can be tiled in the lamp mirror body for mounting, so a spatial thickness required by the assembling of the driving block is much less than that of a large driver, thereby having not large requirement on the thickness on the premise of increasing the area of the mirror surface of the lamp mirror or increasing the power utilization modules, and achieving the effect of the ultrathin LED lamp mirror.

Further, an annular groove 101 with an equal width is formed in an outer end face of the lamp mirror body 100, and a conductive sliding rail 102 is arranged on a bottom wall or a side wall of the annular groove 101; and each of the LED lamp sections and the driving block corresponding thereto are assembled to form a lamp section unit 200, a shape of the lamp section unit 200 is adapted to a cross-sectional shape of the annular groove 101, a conductive contact for abutting against the conductive sliding rail 102 is arranged on a lower end face or a side surface of the lamp section unit 200, and the conductive contact is electrically connected to the driving block.

An outer end face of the lamp mirror body 100 is generally set as a mirror, so in this embodiment, an outer end face of the lamp section unit 200 is also set as a mirror, and the LED lamp section is embedded into the mirror; and after the lamp section unit 200 is put into the annular groove 101, the conductive contact on the lamp section unit 200 is in contact with the conductive sliding rail 102 in the annular groove 101 for electrical connection, thereby supplying power for the driving blocks and the LED lamp sections of the lamp mirror body 100.

In addition, first magnetic attraction pieces with the number corresponding to that of the lamp section units 200 are formed on a side wall of the annular groove 101, and a plurality of first magnetic attraction pieces are arranged equidistantly; and a second magnetic attraction piece for adsorbing each of the first magnetic attraction pieces is arranged on one side of the lamp section unit 200. After the lamp section unit 200 is put at a corresponding position in the annular groove 101, the first magnetic attraction pieces and the second magnetic attraction pieces are adsorbed, so that the stability of the lamp section unit 200 after mounting can be improved.

In this embodiment, for the power utilization modules which are the LED lamp sections, the total power setting of the driving blocks is calculated by the linear programming model, specifically including the following steps:

the following linear programming models are established:

minimaze $V=N\times V_N+M\times V_M$, subject to $N\times M\times P=S$, $N\times M\times P\times L_{MIN}\leq L\leq N\times M\times P\times L_{MAX}$, $N\times M\times P\times B_{MIN}\leq B\leq N\times M\times P\times B_{MAX}$, $N, M\in Z^+$, where V is a total volume of a driving mechanism, N is the number of the LED lamp sections, M is a length of the LED lamp strip, $V_N$ is a volume of a driving mechanism of each of the LED lamp sections, $V_M$ is a volume of each of the lamp section units 200, P is a power of each of the LED lamp sections, S is a total power of the lamp mirror, L is a length of the lamp mirror, $L_{MIN}$ and $L_{MAX}$ are a minimum length and a maximum length of the lamp mirror, B is a brightness of the lamp mirror, $B_{MIN}$ and $B_{MAX}$ are a minimum brightness and a maximum brightness of the lamp mirror, and $Z^+$ represents a positive integer set.

An objective of the model is to minimize the total volume of the driving mechanism on the premise of meeting the requirements of the power, length and brightness of the lamp mirror, thereby achieving the ultrathin design of the lamp mirror.

One possible example is: assuming that the total length of the lamp mirror is 100 W, the length of the lamp mirror is 1 m, the power of each LED lamp is 0.1 W, the volume of the driving mechanism of each section of LED lamps is 0.01 L, the volume of each LED lamp is 0.001 L, the minimum length and the maximum length of the lamp mirror are 0.8 m and 1.2 m, respectively, the minimum brightness and the maximum brightness of the lamp mirror are 80 lx and 120 lx, respectively, then according to the linear programming model, the optimal values of M and N may be calculated as follows:

minimaze $V=N\times 0.01+M\times 0.001$, subject to $N\times M\times 0.1=100$, $N\times M\times 0.1\times 0.8\leq L\leq N\times M\times 0.1\times 1.2$, $N\times M\times 0.1\times 80\leq B\leq N\times M\times 0.1\times 120$, $N, M\in Z^+$.

This problem is solved by a branch and bound method to obtain the optimal values of M and N being 10 and 10, respectively, that is, the LED lamp strip is divided into 10 sections, each section includes 10 LED lamps, the total volume of the driving mechanism is 0.11 L, the length of the lamp mirror is 1 m, the brightness of the lamp mirror is 100 lx, and all the constraint conditions are met.

Further, the lamp mirror of this embodiment further includes a control block and several sensors in signal connection with the control block, and the sensors are configured to acquire information of a current usage scenario. The control block is configured to receive signals of the sensors, calculate the target brightness of each section of LED lamps according to set parameters, and control each section of LED lamps through the driving mechanism. The control block may use a single-chip microcomputer, a microcontroller and a computer, depending on the complexity and the intelligence of the lamp mirror. The core of the control block is an algorithm for optimizing the brightness of each section of LED lamps according to the information of the usage scenario, thereby achieving the best overall effect of the lamp mirror.

The control block of this embodiment performs the following algorithm:

$$L_i = K\times\frac{D_i}{D_0}\times\frac{A_i}{A_0}\times\frac{E_0}{E_i},$$

where $L_i$ is a target brightness of an ith LED lamp section, K is a constant, $D_i$ is a distance between the ith LED lamp section and a human body; $D_0$ is a reference distance, $A_i$ is an included angle between the ith LED lamp section and a human face, $A_0$ is a reference angle, $E_i$ is an ambient illumination of a position where the ith LED lamp section is located, and $E_0$ is a reference illumination.

According to a human body distance, a human face angle and an ambient illumination, the brightness of each section of LED lamps is adjusted to be inversely proportional to a reference value, that is, the closer the distance, the smaller the angle, the darker the illumination, the higher the brightness of the LED lamp, and vice versa, thereby achieving the uniform illumination and the self-adaptive adjustment of the lamp mirror.

One simple example is: assuming that the lamp mirror has 10 sections of LED lamps, each section has 10 LED lamps, the power of each of the Led lamps is 0.1 W, K is 100, $D_0$ is set as 0.5 m, $A_0$ is set as 0 degree, and $E_0$ is set as 100 lx, then according to different usage scenarios, the target brightness of each section of LED lamps can be calculated as follows:

| Scenario | $D_i$ | $A_i$ | $E_i$ | $L_i$ |
|---|---|---|---|---|
| The human body is 0.5 m away from the lamp mirror and faces the lamp mirror, and the ambient illumination is 100 lx | 0.5 | 0 | 100 | 100 |
| The human body is 0.3 m away from the lamp mirror and faces the lamp mirror, and the ambient illumination is 50 lx | 0.3 | 0 | 50 | 333.33 |
| The human body is 0.7 m away from the lamp mirror and faces the lamp mirror, and the ambient illumination is 150 lx | 0.7 | 0 | 150 | 47.62 |
| The human body is 0.5 m away from the lamp mirror and faces the lamp mirror sideways, and the ambient illumination is 100 lx | 0.5 | 45 | 100 | 70.71 |
| The human body is 0.5m away from the lamp mirror and faces the lamp mirror, and the ambient illumination is 50 lx | 0.5 | 0 | 50 | 200 |

It can be seen from the above table that in a case that the human body is closer to the lamp mirror, the ambient illumination is darker, or the included angle between the human face and the lamp mirror is smaller, the target brightness of each section of LED lamps, and vice versa, which is in line with the design objective of this embodiment.

Embodiment 2

This embodiment discloses another method for calculating M and N, specifically as follows: the LED lamp strip is divided into N sections, each section includes M LED lamps, and the power of each of the LED lamps is P. To ensure the ultrathin design of the lamp mirror, it is necessary to make the volume of the driving mechanism of each section of LED lamps as small as possible, so it is necessary to select appropriate values of N and M. Generally, the larger the values of N and M, the lower a driving volume of each section of LED lamps, the smaller the volume of the driving mechanism, but the brightness and the uniformity of the lamp mirror are reduced. Therefore, it is necessary to calculate the optimal values of N and M by the following formula according to the size and brightness requirements of the lamp mirror. The number of the LED lamp sections is calculated by the following method:

$$N = \text{round}\left(sqrt\left(\frac{S}{L*P}\right)\right),$$

where N is the number of the LED lamp sections, S is a total power of the lamp mirror, L is a length of the lamp mirror, and P is an average power of each of the LED lamp sections.

the number of LED lamps in each of the LED lamp sections is set as:

$$M = \text{round}\left(\frac{L}{N*P}\right),$$

where M is a length of an LED lamp strip.

One possible example is: in a case that the total power of the lamp mirror is 100 W, the length of the lamp mirror is 1 m and the power of each of the LED lamps is 0.1 W, $$N = \text{round}\left(sqrt\left(\frac{100}{1*0.1}\right)\right) = 10,$$

and $$M = \text{round}\left(\frac{1}{10*0.1}\right) = 10,$$

that is, the LED lamp strip is divided into 10 sections, and each section includes 10 LED lamps.

In conclusion, the ultrathin LED lamp mirror of this embodiment is provided with the plurality of LED lamp sections and driving blocks corresponding to the LED lamp sections, and the corresponding LED lamp section is driven by a single driving block, so that the thickness of the driving blocks is reduced, and the structural design of the ultrathin LED lamp mirror is achieved.

Embodiment 2

This embodiment provides a mirror cabinet, including a cabinet body and a cabinet door rotatably arranged on the cabinet, and the ultrathin LED lamp mirror according to Embodiment 1 is arranged at one end of the cabinet door facing away from the cabinet body, so that the thickness of the cabinet door of this embodiment can be reduced, thereby improving the use experience and facilitating the opening and closing of the door.

Finally, it should be noted that the above embodiments are only used to describe the technical solutions of the present invention, but not to limit the protection scope of the present invention. Although the present invention is described in detail with reference to the preferred embodiments, those of ordinary skill in the art should understand that modification or equivalent substitution may be made on the technical solutions of the present invention without departing from the spirit and scope of the technical solutions of the present invention.

What is claimed is:

1. An ultrathin LED lamp mirror, comprising a lamp mirror body and a plurality of power utilization modules arranged in the lamp mirror body, wherein each of the power utilization modules is connected to a driving block; the driving block is configured to supply power for each of the power utilization modules; and the power utilization modules are LED lamp sections or heating films;

wherein an annular groove with an equal width is formed in an outer end of the lamp mirror body; and a conductive sliding rail is formed in a bottom wall or a side wall of the annular groove; and each of the LED lamp sections and the driving block corresponding thereto are assembled to form a lamp section unit, a shape of the lamp section unit is adapted to a cross-sectional shape of the annular groove, a conductive contact for abutting against the conductive sliding rail is arranged on a lower end face or a side surface of the lamp section unit, and the conductive contact is electrically connected to the driving block.

2. The ultrathin LED lamp mirror according to claim 1, wherein first magnetic attraction pieces with the number corresponding to that of the lamp section units are formed on a side wall of the annular groove, and a plurality of first magnetic attraction pieces are arranged equidistantly; and a second magnetic attraction piece for adsorbing each of the first magnetic attraction pieces is arranged on one side of the lamp section unit.

3. The ultrathin LED lamp mirror according to claim 1, wherein the power utilization modules are LED lamp sections, and more than one LED lamp section is arranged to form an LED lamp strip; and the total power setting of all the driving blocks performs the following method:

establishing the following linear programming models:

minimaze $V=N\times V_N+M\times V_M$, subject to $N\times M\times P=S$, $N\times M\times P\times L_{MIN}\leq L\leq N\times M\times P\times L_{MAX}$, $N\times M\times P\times B_{MIN}\leq B\leq N\times M\times P\times B_{MAX}$, $N, M\in Z^+$, wherein V is a total volume of a driving mechanism, N is the number of the LED lamp sections, M is a length of the LED lamp strip, $V_N$ is a volume of a driving mechanism of each of the LED lamp sections, $V_M$ is a volume of each of the lamp section units, P is a power of each of the LED lamp sections, S is a total power of the lamp mirror, L is a length of the lamp mirror, $L_{MIN}$and $L_{MAX}$ are a minimum length and a maximum length of the lamp mirror, B is a brightness of the lamp mirror, $B_{MIN}$ and $B_{MAX}$ are a minimum brightness and a maximum brightness of the lamp mirror, and $Z^+$ represents a positive integer set.

4. The ultrathin LED lamp mirror according to claim 1, wherein the number of the LED lamp sections is set as:

$$N = \text{round}\left(sqrt\left(\frac{S}{L*P}\right)\right),$$

wherein N is the number of the LED lamp sections, S is a total power of the lamp mirror, L is a length of the lamp mirror, and P is an average power of each of the LED lamp sections; and the number of LED lamps in each of the LED lamp sections is set as:

$$M = \text{round}\left(\frac{L}{N*P}\right),$$

wherein M is a length of an LED lamp strip.

5. The ultrathin LED lamp mirror according to claim 1, wherein the ultrathin LED lamp mirror is configured to perform the following algorithm:

$$L_i = K\times\frac{D_i}{D_0}\times\frac{A_i}{A_0}\times\frac{E_0}{E_i},$$

wherein $L_i$ is a target brightness of an $i^{th}$ LED lamp section, K is a constant, $D_i$ is a distance between the $i^{th}$ LED lamp section and a human body; $D_0$ is a reference distance, $A_i$ is an included angle between the $i^{th}$ LED lamp section and a human face, $A_0$ is a reference angle, $E_i$ is an ambient illumination of a position where the $i^{th}$ LED lamp section is located, and $E_0$ is a reference illumination.

6. A mirror cabinet, comprising a cabinet body and a cabinet door rotatably arranged on the cabinet, wherein the ultrathin LED lamp mirror according to claim 1 is arranged at one end of the cabinet door facing away from the cabinet body.

* * * * *